United States Patent [19]

Kabayashi et al.

[11] Patent Number: 4,794,418
[45] Date of Patent: Dec. 27, 1988

[54] PROGRAMMED SHUTTER AND APPARATUS FOR PREVENTING FOREIGN MATTER ON LENS FROM BEING PHOTOGRAPHED IN A LENS SHUTTER TYPE OF CAMERA

[75] Inventors: Takeo Kabayashi; Shigeru Kondoh; Etsuroh Nishio; Shinsuke Kohmoto, all of Tokyo, Japan

[73] Assignee: Asahi Kogaku Kogyo Kabushiki Kaisha, Tokyo, Japan

[21] Appl. No.: 130,561

[22] Filed: Dec. 8, 1987

[30] Foreign Application Priority Data

Dec. 12, 1986 [JP] Japan .................. 61-296175
Dec. 12, 1986 [JP] Japan .................. 61-191524[U]

[51] Int. Cl.⁴ .................. G03B 7/089; G03B 11/00
[52] U.S. Cl. .................. 354/435; 354/195.1; 354/195.11; 354/483
[58] Field of Search .................. 354/435, 436, 437, 438, 354/439, 440, 441, 442, 443, 482, 483, 195.1, 195.11

[56] References Cited

U.S. PATENT DOCUMENTS

| | | | |
|---|---|---|---|
| 3,035,489 | 5/1962 | Simons | 354/195.11 |
| 3,918,798 | 11/1975 | Takano | 354/195.11 |
| 3,978,497 | 8/1976 | Kondo | 354/483 |
| 3,987,461 | 10/1976 | Kondo | 354/483 |
| 4,123,764 | 10/1978 | Uno et al. | |
| 4,203,661 | 5/1980 | Besenmatter | 354/195.11 |
| 4,269,490 | 5/1981 | Takami | |
| 4,345,825 | 8/1982 | Matteson et al. | 354/443 |
| 4,473,281 | 9/1984 | Hama | |

FOREIGN PATENT DOCUMENTS 60-235126 11/1985 Japan .

Primary Examiner—Russell E. Adams
Attorney, Agent, or Firm—Sandler & Greenblum

[57] ABSTRACT

A programmed shutter and an apparatus are provided for preventing material, such as dust, on camera lenses from being photographed. The shutter can be used alone, or can be used together with a pivotable neutral density filter which can be selectively positioned along the optical axis of a lens system having a zoom lens or at least two focal length positions.

35 Claims, 12 Drawing Sheets

| | T0 | T1 | T2 | T3 | T4 | T5 | T6 | T7 |
|---|---|---|---|---|---|---|---|---|
| $\triangle Ev$ | 0 | 0.25 | 0.50 | 0.75 | 1.00 | 1.25 | 1.50 | 1.75 |
| restricted Dv | 15 | 15 | 15 | 15 | 16 | 16 | 16 | 16 |

| Dv | T0 | T1 | T2 | T3 | T4 | T5 | T6 | T7 |
|---|---|---|---|---|---|---|---|---|
| 9.00 | ⇐ 9.00 | 9.25 | 9.50 | 9.75 | 10.00 | 10.25 | 10.50 | 10.75 |
| 9.25 | ⇐ 9.25 | 9.50 | 9.75 | 10.00 | 10.25 | 10.50 | 10.75 | 11.00 |
| 9.50 | ⇐ 9.50 | 9.75 | 10.00 | 10.25 | 10.50 | 10.75 | 11.00 | 11.25 |
| 9.75 | ⇐ 9.75 | 10.00 | 10.25 | 10.50 | 10.75 | 11.00 | 11.25 | 11.50 |
| 10.00 | ⇐ 10.00 | 10.25 | 10.50 | 10.75 | 11.00 | 11.25 | 11.50 | 11.75 |
| 10.25 | ⇐ 10.25 | 10.50 | 10.75 | 11.00 | 11.25 | 11.50 | 11.75 | 12.00 |
| 10.50 | ⇐ 10.50 | 10.75 | 11.00 | 11.25 | 11.50 | 11.75 | 12.00 | 12.25 |
| 10.75 | ⇐ 10.75 | 11.00 | 11.25 | 11.50 | 11.75 | 12.00 | 12.25 | 12.50 |
| 11.00 | ⇐ 11.00 | 11.25 | 11.50 | 11.75 | 12.00 | 12.25 | 12.50 | 12.75 |
| 11.25 | ⇐ 11.25 | 11.50 | 11.75 | 12.00 | 12.25 | 12.50 | 12.75 | 13.00 |
| 11.50 | ⇐ 11.50 | 11.75 | 12.00 | 12.25 | 12.50 | 12.75 | 13.00 | 13.25 |
| 11.75 | ⇐ 11.75 | 12.00 | 12.25 | 12.50 | 12.75 | 13.00 | 13.25 | 13.50 |
| 12.00 | ⇐ 12.00 | 12.25 | 12.50 | 12.75 | 13.00 | 13.25 | 13.50 | 13.75 |
| 12.25 | ⇐ 12.25 | 12.50 | 12.75 | 13.00 | 13.25 | 13.50 | 13.75 | 14.00 |
| 12.50 | ⇐ 12.50 | 12.75 | 13.00 | 13.25 | 13.50 | 13.75 | 14.00 | 14.25 |
| 12.75 | ⇐ 12.75 | 13.00 | 13.25 | 13.50 | 13.75 | 14.00 | 14.25 | 14.50 |
| 13.00 | ⇐ 13.00 | 13.25 | 13.50 | 13.75 | 14.00 | 14.25 | 14.50 | 14.75 |
| 13.25 | ⇐ 13.25 | 13.50 | 13.75 | 14.00 | 14.25 | 14.50 | 14.75 | 15.00 |
| 13.50 | ⇐ 13.50 | 13.75 | 14.00 | 14.25 | 14.50 | 14.75 | 15.00 | 15.25 |
| 13.75 | ⇐ 13.75 | 14.00 | 14.25 | 14.50 | 14.75 | 15.00 | 15.25 | 15.50 |
| 14.00 | ⇐ 14.00 | 14.25 | 14.50 | 14.75 | 15.00 | 15.25 | 15.50 | 15.75 |
| 14.25 | ⇐ 14.25 | 14.50 | 14.75 | 15.00 | 15.25 | 15.50 | 15.75 | 16.00 |
| 14.50 | ⇐ 14.50 | 14.75 | 15.00 | 15.25 | 15.50 | 15.75 | 16.00 | 16.25 |
| 14.75 | ⇐ 14.75 | 15.00 | 15.25 | 15.50 | 15.75 | 16.00 | 16.25 | 16.50 |
| 15.00 | ⇐ 15.00 | 15.25 | 15.50 | 15.75 | 16.00 | 16.25 | 16.50 | 16.75 |
| 15.25 | ⇐ 15.25 | 15.50 | 15.75 | 16.00 | 16.25 | 16.50 | 16.75 | 17.00 |
| 15.50 | ⇐ 15.50 | 15.75 | 16.00 | 16.25 | 16.50 | 16.75 | 17.00 | 17.25 |
| 15.75 | ⇐ 15.75 | 16.00 | 16.25 | 16.50 | 16.75 | 17.00 | 17.25 | 17.50 |
| 16.00 | ⇐ 16.00 | 16.25 | 16.50 | 16.75 | 17.00 | 17.25 | 17.50 | 17.75 |
| 16.25 | ⇐ 16.25 | 16.50 | 16.75 | 17.00 | 17.25 | 17.50 | 17.75 | 18.00 |
| 16.50 | ⇐ 16.50 | 16.75 | 17.00 | 17.25 | 17.50 | 17.75 | 18.00 | 18.25 |
| 16.75 | ⇐ 16.75 | 17.00 | 17.25 | 17.50 | 17.75 | 18.00 | 18.25 | 18.50 |
| 17.00 | ⇐ 17.00 | 17.25 | 17.50 | 17.75 | 18.00 | 18.25 | 18.50 | 18.75 |

Fig. 10

PROGRAMMED SHUTTER AND APPARATUS FOR PREVENTING FOREIGN MATTER ON LENS FROM BEING PHOTOGRAPHED IN A LENS SHUTTER TYPE OF CAMERA

BACKGROUND OF THE DISCLOSURE

1. Technical Field of the Invention

The present invention generally relates to a programmed shutter and to an apparatus for preventing fine particles of foreign matter, e.g., dust, which is located on a lens, from being photographed; and more specifically to such an apparatus which prevents photographing of foreign matter, such as dust, on a lens in a lens shutter tyoe of camera having a zoom lens system.

2. Description of Related Art

In conventional cameras, even when foreign material is located on a camera lens, there is no possibility that the foreign matter will be photographed in the picture, provided that such matter comprises fine material. This is because the area which is occupied by the fine foreign matter is extremely small with respect to the rays of light which define the picture (i.e., the image), such that any image of such foreign matter will be dimmed due to the diffraction of light.

However, in a zoom lens system in which the position of the diaphragm of the camera varies, such as has been developed by the assignee of the present application, the exit pupil of the camera closely approaches the film plane at one of the focal length extremities of the camera. Accordingly, at a small value of the disphragm, in which the diameter of the exit pupil is below a predetermined value, i.e., when the lens system closely approaches the film plane, foreign matter which is located on the rearmost lens adjacent the center of the lens will be photographed in the picture. A zoom lens camera such as that referred to above is the subject of PCT patent application Ser. Nos. PCT/JP87/00292 and PCT/JP87/00293, both of which were filed on May 12, 1987, and both of which are expressly incorporated by reference herein.

FIGS. 7A 7B, and 7C all show how foreign matter on the rear surface of a lens is photographed when a picture is taken.

Specifically, FIGS. 7A and 7B illustrate a lens system L which closely approaches the film plane F, when the lens system is at its minimum focal length. In FIG. 7A, foreign matter cannot be photographed when taking a picture, and, in FIG. 7B, foreign matter will be photographed as a black point in the picture when the photograph is taken. Assuming that foreign matter Q, having a diameter of d $\phi$, is applied to the center portion of the rearmost lens of lens system L, when exit pupil P of lens system L is small and when the distance between the rearmost lens and film plane F is also small, the quantity of light on the center of film plane F will be decreased by the presence of the foreign matter thereon. Such a decreased quantity of light will effect a phenomenon in which the foreign matter is photographed. When the diameter of the foreign matter is 0.3 mm $\phi$, which is the most likely diameter of material which will be located on lens system L, the minimum exit pupil P which will not recognize such foreign matter is, e.g., F13.5 (see FIG. 7A). When the exit pupil P is smaller than F13.5, e.g., when the exit pupil P is F22, foreign matter can be clearly recognized and will be photographed, as shown in FIG. 7B.

To the contrary, when lens system L moves forwardly towards a maximum focal length, as shown in FIG. 7C, no problem of decreased light resulting from the presence of foreign matter Q will occur, even if exit pupil P is F22, which is identical to the diaphragm aperture at the minimum focal length of the camera. Specifically, when the distance between the lens system and film plane F is above a predetermined value, no foreign matter can be photographed.

Recently, with zoom lens being used having increased magnifications, and with minimization of the size of the lens system, it has occurred that the rearmost position of the lens system and of the exit pupil more closely approach the film plane. This results in an increased possibility that foreign matter will be photographed in pictures being taken with such cameras.

In another known camera, in which a focus switching lens moves in and out of the optical path of the lens system in order to selectively provide maximum and minimal focal lengths for the lens system, such a problem (photographing of dirt and other particles) also occurs.

SUMMARY OF THE INVENTION

One primary object of the present invention is, therefore, to provide a programmed shutter and an apparatus which will both eliminate the drawbacks caused by undesireable foreign matter being photographed in a programmed lens shutter type of camera having a zoom lens.

To achieve such an object as described above, in accordance with the present invention, the problem is first solved by use of a specific program in the programmed shutter; and, secondly, by a combination of such a specific program and a novel apparatus for preventing foreign matter from being photographed.

According to one aspect of the present invention, in which the solution is directed only to an improved program for the programmed shutter, a specific range of diaphragm values in which foreign matter can be photographed will not be used. Theoretically, it is possible in a programmed shutter to open the shutter when the diaphragm achieves a specific value in order to increase the shutter speed and to thereby take a picture at the same EV (i.e., exposure value). However, when using a programmed shutter, there is an upper limit for the shutter speed, and, accordingly, the use of a solution to the problem which involves increases in camera shutter speed is impracticable and unadvisable.

Generally speaking, in a variable power lens system, the mechanical diaphragm aperture can be varied so as to have a plurality of F values which correspond to, e.g., the minimum diaphragm aperture at the maximum focal length and to the maximum diaphragm aperture at the minimum focal length, in accordance with the change in the focal length of the lens system, respectively. In other words, when magnification is decreased towards the minimum focal length of the lens after setting the F number at the longest focal length, the F number will become relatively small, i.e., more light will be transmitted through the diaphragm aperture. It should be noted that even if the relative F number becomes small, it will not be possible to solve the problem of photographing foreign matter at a short focal length, as long as no change in the mechanical diaphragm occurs.

To solve this problem, in accordance with the present invention, the diaphragm aperture can be increased, at a short focal length in which the lens system closely approaches the film plane, in order that no foreign matter will be photographed; this can be achieved by increasing the diaphragm aperture beyond the F number which corresponds to the minimum diaphragm diameter which is set at the long focal length of the lens system.

In accordance with one aspect of the invention, a lens shutter type of camera is provided having a zoom lens system or a variable power lens system with a maximum and a minimum focal length; in such cameras, the same mechanical diaphragm aperture will vary so as to be identical to the F number which corresponds to the small diaphragm aperture on the long focal length side and to the F number which corresponds to the large diaphragm aperture on the short focal length side, respectively. The diaphragm aperture changes in accordance with a change in focal lengths. A programmed shutter in accordance with the present invention is used in such structure; in this shutter, it is assumed that the F number of the short focal length side, which is obtained when the lens system focal length is changed, is set at Fa, which is larger than Fb, the minimum aperture value on the long focal length side of the lens system. In this manner, the programmed shutter program diagram will be determined as a combination of the F numbers and the shutter speed.

In accordance with another aspect of the present invention, an apparatus is provided for preventing foreign matter from being photographed, in combination with the programmed shutter referred to above. In accordance with this aspect of the present invention, the basic idea is that a ND (i.e., neutral density) filter is moved to a center of the lens system under specific conditions in which foreign matter could otherwise be photographed. In this fashion, when the ND filter moves into the optical path of the center of the lens, the program determines a combination of a diaphragm aperture larger than the diaphragm aperture prior to movement of the ND filter, and a corresponding shutter speed, in order to prevent the diaphragm value from becoming a value at which foreign matter can be photographed.

Specifically, apparatus is provided for preventing foreign matter from being photographed in a programmed shutter type of camera having either a zoom lens or a switching lens system with long and short focal lengths. Such apparatus comprises a ND filter which selectively moves into and out of an optical path of the lens system and an actuator for moving the ND filter. When the ND filter is located in the lens system optical path, exposure can be controlled by a program which is determined by a combination of the diaphragm aperture, which is larger than the diaphragm aperture prior to movement of the ND filter into the optical path, and a shutter speed which corresponds to the diaphragm aperture, in accordance with the amount of light which is transmitted through the ND filter.

In another aspect, a programmed shutter is used in a lens shutter type of camera having a lens system with at least two different focal lengths, the camera having a variable mechanical diaphragm aperture having F numbers, respectively, corresponding to a small diaphragm aperture on the long focal length side of the lens system and to a large diaphragm aperture on the short focal length side of the lens system, in accordance with changing focal lengths of the lens system. The shutter is constructed such that the diaphragm has an F number Fa on the short focal length side of the lens system, with Fa being larger than an F number Fb. The F number Fb is obtained when the focal length of the lens system is changed while maintaining the minimum diaphragm aperture on the long focal length side of the lens system. The diaphragm has a minimum value Fa on the short focal length side of the lens system representing a greater diaphgram aperture than Fb; and the shutter comprises means for controlling exposure in the camera by controlling a combination of the F numbers and shutter speeds corresponding to the F numbers.

The lens system can be a variable power lens system comprising a zoom lens system, wherein variations in the focal length and F numbers of the zoom lens system are represented by a focal length-F-number program diagram.

The diaphragm aperture includes a first area which is smaller than an area, on the focal length-F-number diagram, defined by a line which connects the minimum diaphragm value at the longest focal length of the zoom lens system and the minimum diaphragm value at a shorter focal length of the zoom lens system, the programmed shutter including means for non-use (or ignoring) the first area.

The minimum diaphragm value at the shorter focal length side of the lens system is identical to the minimum diaphragm value at the shortest focal length side of the zoom lens system.

The minimum diaphragm value at the shorter focal length side of the zoom lens system is identical to the minimum diaphragm value at an intermediate focal length of the zoom lens system.

The camera can have a zoom lens system, or a variable power lens system having at least two focal lengths.

In a lens shutter type of camera having a lens system with at least two different focal lengths, a device is provided for preventing foreign matter on at least one lens in the lens system from being photographed. The device comprises a neutral density filter which can be selectively inserted along the optical path of the lens system and an actuator for moving the neutral density filter into an operational position in which the filter is inserted along the lens system optical path. The device thereby comprises means for controlling exposure, the exposure controlling means comprising means for setting a diaphragm aperture which is larger than the diaphragm aperture prior to insertion of the neutral density filter along the optical path and a shutter speed which corresponds to the diaphragm aperture, wherein the diaphragm aperture and the shutter speed are both selected in accordance with the quantity of light which is transmitted through the neutral density filter.

The neutral density filter has a diameter which is larger than a diameter of an exit pupil of the camera, the neutral density filter being located at the center of the lens system when it is inserted along the optical path of the lens system.

The neutral density filter is attached to a front end of a swingable arm which rotates about an axis located away from the optical path of the lens system, the arm being actuated by an actuator. The swing arm comprises a non-photographible material, or is positioned away from the image plane of the camera.

The device further comprises a control circuit which is adapted to receive input signals from a focal length detecting device, a subject distance detecting device, and a diaphragm value detecting device in order to actuate the swing arm when the control circuit determines that there is a possibility that foreign matter will be photographed in a picture, wherein the swing arm, when actuated, pivots in order to move the neutral density filter into the optical path of the lens system, the control circuit comprising means for determining the exposure in accordance with a program diagram which is shifted towards an EV (exposure value) value having a larger diaphragm aperture than does a program diagram before insertion of said filter along said optical path.

A plurality of pivotable neutral density filters which are superimposed upon each other in order to vary their light transmission efficiency, the camera further comprising means for shifting the program diagram towards a small EV value in accordance with a decrease in the light transmission efficiency of the neutral density filter.

A plurality of neutral density filters which are adapted to be selectively and individually positioned along the optical axis of the lens system in order to vary the light transmission efficiency of the filter, the device further comprising means for shifting the program diagram towards a small EV value in accordance with a decrease in the light transmission efficiency of the neutral density filter which is positioned along the optical axis. The lens system is either a zoom lens system or a variable power lens system having at least two different focal lengths.

A device is adapted for use in a lens shutter type of camera having either a zoom lens system or a variable power lens system having at least two focal lengths, the camera further including a mechanical diaphragm aperture with F numbers on long and short focal length sides of the lens system, which F numbers change in accordance with change in the focal length of the lens system, the device including means for preventing the camera from photographing undesirable material which is present on the lens system.

The preventing means comprises means for controlling exposure in accordance with the F numbers and corresponding shutter speed, the device having a minimum F number Fa, on the short focal length side of the lens system. Fa is larger than the minimum F number Fb of the diaphgram aperture when the lens system closely approaches a camera film plane.

The lens system can be a zoom lens, the device further comprising a program diagram for controlling a programmed shutter, the program diagram comprising an F number Fd at an intermediate focal length area.

The program diagram includes eight focal length steps, the shutter comprising means for determining shutter speeds and diaphragm F numbers in accordance with the exposure value of a subject to be photographed.

The minimum diaphragm value F is F 13.5 at a WIDE position of the lens system and F 42 at a TELE position of the lens system. The diagram comprises means for excluding said shutter from operating in all areas in which foreign matter on the lens can be photographed.

The preventing means further comprises a pivotable arm having a neutral density filter attached to one end of the arm, the filter being selectively pivotable into the optical axis of the lens system.

The filter has a diameter D larger than a diameter of the camera exit pupil, and the arm can be attached to a shaft of a pivotable actuator at a second end of the arm.

The filter is pivotable between a first, operative position along the optical axis of the lens system and a second, retracted position away from the optical axis.

The arm can be transparent, or can have a width which is too small to be viewed in a photograph.

The filter, the arm, and the actuator are supported in a lens barrel which also supports the lens system, wherein the filter, arm and actuator are all moveable together with the lens system.

The device further comprises a program circuit, a pivot providing arm actuator, and a control circuit.

The control circuit comprises means for receiving focal length data, subject distance data, and diaphragm F value data, and comprises means for giving operational signals to the pivoting arm actuator in order to selectively pivot the neutral density filter.

The control circuit further comprises means for directing the program circuit to control exposure in accordance with a shifted program diagram which has been shifted to decrease exposure values from those exposure values on a first program diagram.

The device further comprises a shutter control device, a code plate with lens system focal length data, a light measuring device, and a film sensitivity measuring device, the shutter control device comprising means for outputting a driving signal for driving a shutter in accordance with receipt of film sensitivity data, brightness data, and focal length data.

BRIEF DESCRIPTION OF THE DRAWINGS

The above-identified objects, features and advantages of the present invention will be more fully described with respect to the accompanying drawings, in which like reference numerals are used to illustrate similar parts throughout the several view, and wherein:

FIG. 10 is a table showing actual EV values and shutter driving signals Dv which can be obtained at a variety of focal lengths;

DESCRIPTION OF PREFERRED EHBODIMENTS

Figure 1:
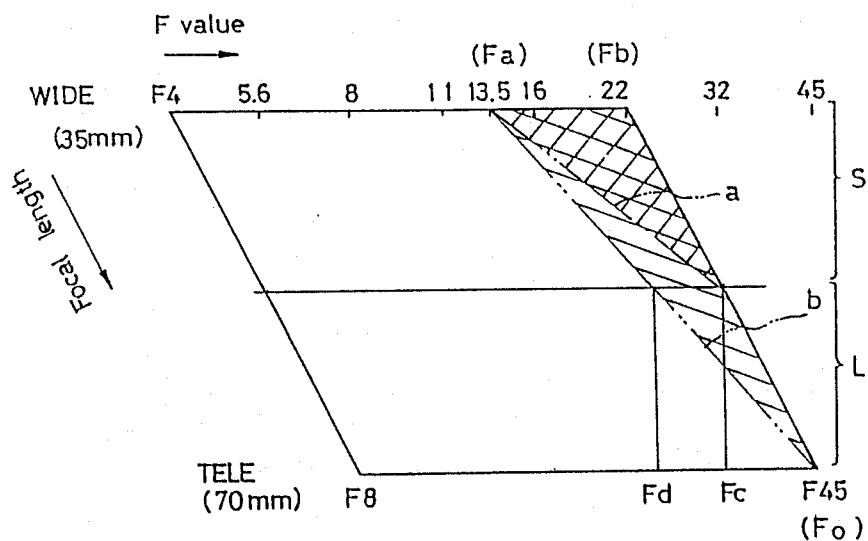
FIG. 1 is a focal length-F number program diagram illustrating a relationship between the focal length of the zoom lens and the F number, representing a basic concept of the present invention.

FIG. 1 is a focal length-F number diagram of a zoom lens system. In this Fig., the F number varies in accordance with changes in the focal length from a wide angle extremity (i.e., WIDE) position, to a telephoto extremity (i.e., TELE) position. Since the F number is established by the ratio between the focal length and the aperture diaphragm (i.e., the focal length/aperture diaphragm), the F number will vary in accordance with the change in the focal length, as noted above, when the mechanical aperture does not change. Specifically, in the first embodiment of the invention which is illustrated in FIG. 1, the maximum F number F4 and the minimum F number F22 at the short focal length (35 mm) correspond to a maximum F number FS and the minimum F number F45 at the long focal length (70 mm), respectively.

The programmed shutter of the present invention is capable of preventing foreign matter from being photographed by controlling exposure in accordance with a diaphragm aperture which is larger than the minimum F number F22 and a corresponding shutter speed, on the short focal length side in which the lens system closely approaches the film plane.

Specifically, in the example referred to above, when magnification is changed towards the short focal length after the minimum F number at the long focal length has been set to be F45, the F number will become F22. Assuming that F22 is Fb, the F number Fb is not used in the actual program of the programmed shutter. In other words, Fa (e.g., F=13.5) which is larger than Fb is determined to be the minimum F number at the short focal length, such that exposure can be controlled by such a minimum F number and the shutter speed which corresponds thereto.

It is, thus, not practical to use minimum F numbers in areas a and b of the short focal length side in FIG. 1, in view of the distance which exists between the zoom lens and the film plane, which distance depends upon the variation in magnification of the zoom lens.

Area a is determined as set forth hereinafter. It is assumed that the focal length range of the zoom lens system is divided into two areas, i.e., an area L which defines an area from the maximum (i.e., longest) focal length to an intermediate focal length, and area S, which covers an area from the intermediate focal length to the minimum (i.e., shortest) focal length. No change will be made in the program diagram for area L; to the contrary, for area S, the program diagram will be modified as set forth herein: specifically, assuming that the F number at the shortest focal length is Fb when the focal length varies and while the minimum diaphragm aperture Fc is maintained in the intermediate area, an F-value Fa, larger than Fb, will be selected as the minimum diaphragm value at the minimum focal length. The area a is thus defined by connecting Fa and Fc on the program diagram.

Further, area b is defined by connecting F numbers Fa and Fo, which represents the minimum diaphragm aperture at the longest focal length of the zoom lens of the program diagram. As a result, in the intermediate area between the longest focal length and the shortest focal length of the zoom lens, where the focal length of the zoom lens system varies, the minimum diaphragm aperture is maintained at the longest focal length Fc; and an F number Fd, corresponding to a diaphragm aperture larger than Fc, will be set as the minimum diaphragm value in the intermediate area.

Figure 2:
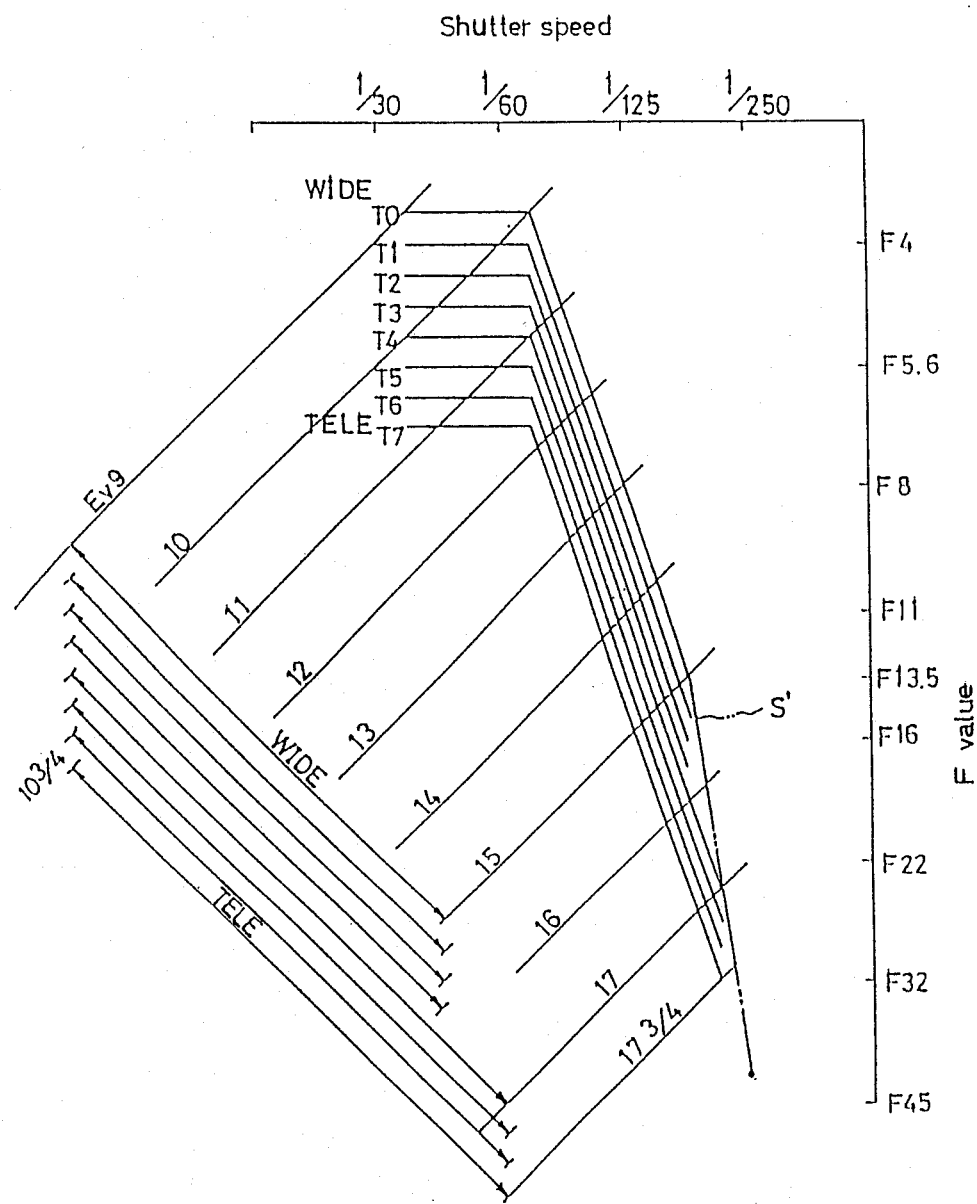
FIG. 2 is one example of a program diagram of a programmed shutter used in accordance with the present invention.
Figure 3:
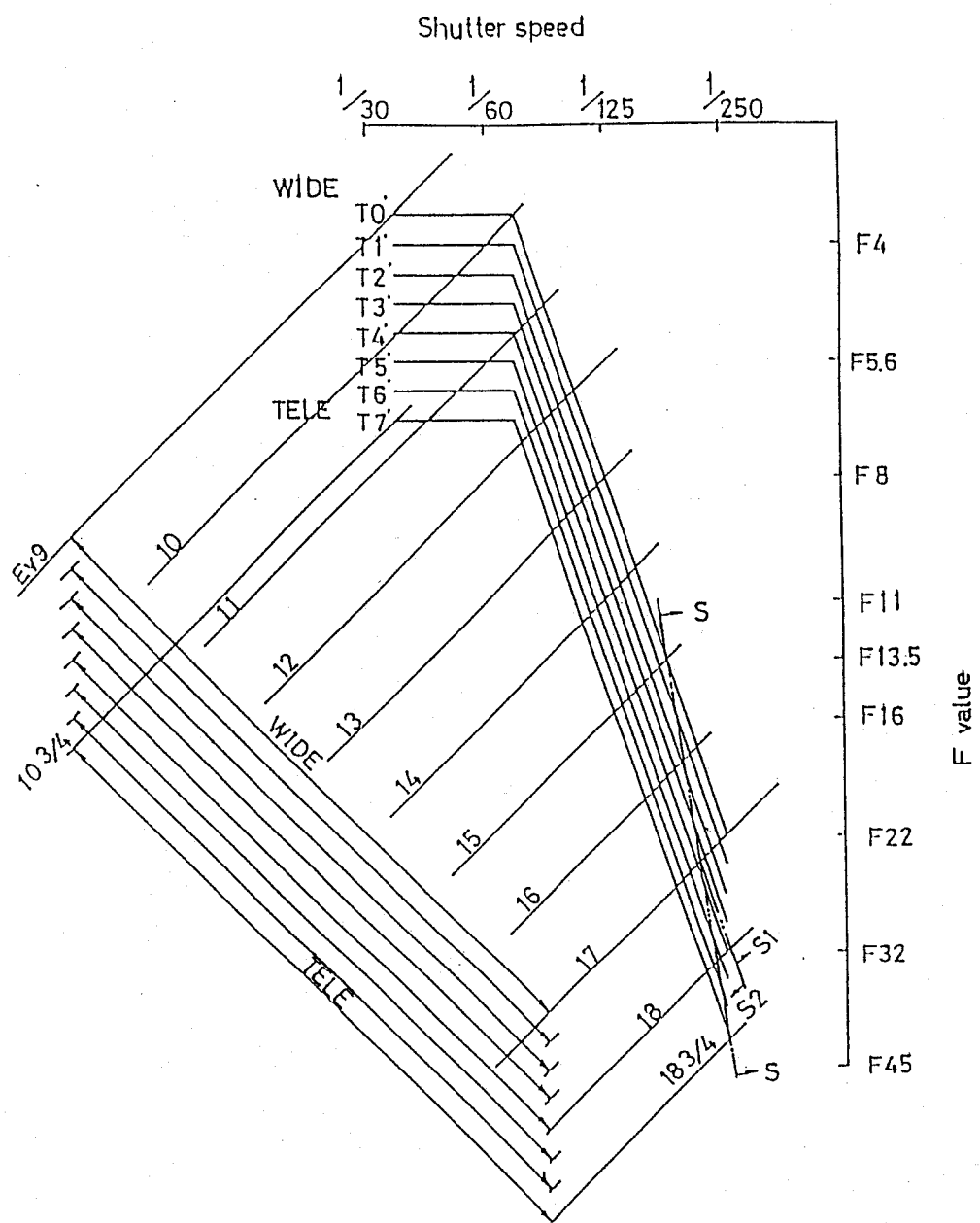
FIG. 3 is a program diagram of a programmed shutter used in accordance with the present invention in which no problem of foreign matter being photographed occurs.

A detailed discussion will follow, with specific reference to FIGS. 2 and 3, which illustrate program diagrams of the programmed shutter of the present invention. The numerical values provided in FIGS. 2 and 3 are slightly different from those in FIG. 1.

FIG. 2 illustrates a program diagram of a programmed shutter according to the present invention, and FIG. 3 illustrates a program diagram in which no problem resulting from foreign matter being photographed will occur. In FIG. 3, the program diagram varies from T0' to T7' (i.e., eight steps), in accordance with the change of the F number, which varies in accordance with the change of the focal length from the short focal length (i.e., WIDE: 36 mm) to the long focal length (i.e., TELE: 68 mm). The programmed shutter determines the shutter speed and the diaphragm value, in accordance with a predetermined program when the EV value (i.e., the exposure value) of a subject to be photographed is well known.

When there is no problem that foreign matter will be photographed, as noted above, it is possible to control the exposure from EV9 (WIDE extremity: T0') to EV18.75 (TELE extremity: T7'). The minimum diaphragm apertures at the two extremities are, therefore, F22 and F42, respectively.

In the above-noted example, when the diaphragm aperture at WIDE extremity T0' is below F13.5, or the diaphragm aperture at TELE extremity T7' is below F42 (corresponding to F22 at the WIDE extremity), a problem involving the potential photographing of foreign matter will arise. In order to solve such a problem, in the present invention, an area or line S, which is defined by connecting the two noted points (i.e., F13.5 at WIDE T0' and F42 at TELE T7') in FIG. 3, will be deemed to be an area in which foreign matter can be photographed, so that a modified program diagram T0-T7, which does not include the area S, will (need to) be established, as illustrated in FIG. 2. It should be noted that area S corresponds to area b in FIG. 1. Area S is determined by the maximum EV which provides a shutter speed identical to a reference shutter speed of about 1/190 seconds which is obtained by the representation T0=13.5 on the diagram, for the area S1 of T0~T3 on the WIDE extremity side. Accordingly, the minimum diaphragm value decreases in a direction from T1 towards T2 and T3 (and the F number increases).

Looking at T4~T7 on the TELE extremity side, the maximum EV (the minimum diaphragm value F32 at 17.75 being located at T7) is determined on the basis of a reference EV which provides a shutter speed of about 1/220 seconds. This takes into account the associated EV on the WIDE extremity side as well. On the TELE side, when the diaphragm value is about F42 (corresponding to F22 at the WIDE extremity), the possibility that foreign matter will be photographed is quite small, because the rearwardmost lens of the zoom lens system usually moves forward on the TELE side. However, F42 is generally not used. Additionally, it is a quite important consideration to balance the EV between the TELE side and the WIDE side. Because of this balance, it is also preferred to make the maximum EV smaller along the TELE side.

It should be appreciated that, only for the purposes of preventing foreign matter from being photographed, it is theoretically unnecessary to limit the maximum EV on the TELE side. Specifically, it is possible to set a maximum EV at a value which is as large as possible.

As noted above, however, in view of the desirability of balancing the EV between the WIDE side and the TELE side, it is preferable to establish an area or section S', which is obtained by connecting two points, i.e., T0=F13.5 (about 1/190 seconds) and T7=F42 (about 1/250 seconds) as an area in which foreign matter can be photographed in the picture, as illustrated in FIG. 2. However, this way of determining section S' results in relatively complex programming of the program shutter, and thus no significant increase in the precision of exposure control can be expected to result.

The above results in the minimum diaphragm aperture on the WIDE side being identical to the diaphragm aperture Fa (F13.5), which is smaller than the diaphragm aperture F22 (or F16, Fb), when zooming is effected towards the WIDE side after the minimum diaphragm aperture F22 (or F32) is set on the TELE side.

Although the above discussion has been mainly directed to a zoom lens system having eight focal length steps, it should be easily understood that the number of steps for setting area S can be increased in accordance with an increase in the number of focal length steps.

It should be noted that in a two focal length type of camera, the program diagram can be modified as noted above only when the switching lens is brought into the optical path of the lens system.

Programmed shutters per se are well known. For example, one well known programmed shutter is illustrated in Japanese Printed Publication 60-235,126, the disclosure of which is expressly incorporated by reference herein.

As noted from the above discussion, and in accordance with the present invention, the programmed shutter can be used to prevent foreign matter from being photographed in a picture. Consequently, when using such a programmed shutter in a lens shutter type of camera having either a zoom lens system or a variable power lens system, the freedom of design of the optical system can be increased, thereby resulting in a compact and effective zoom lens.

Figure 4:
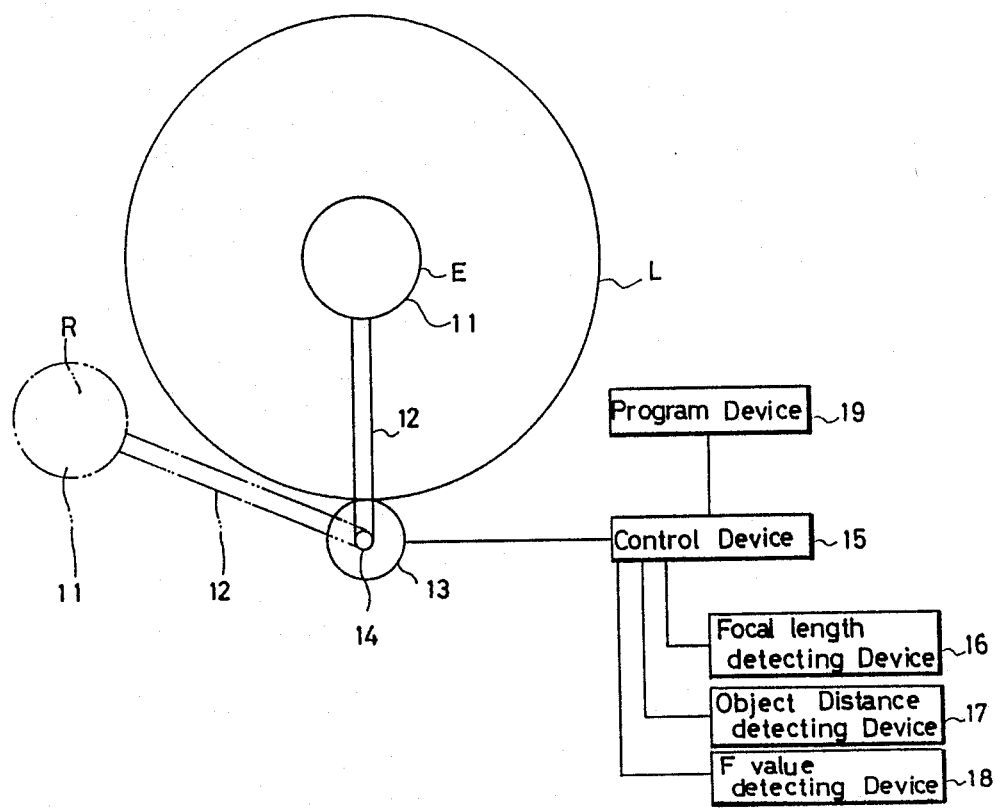
FIG. 4 illustrates a second embodiment of the present invention; specifically, it illustrates a front elevational view of a mechanical arrangement for a programmed shutter used in the present device.
Figure 5:
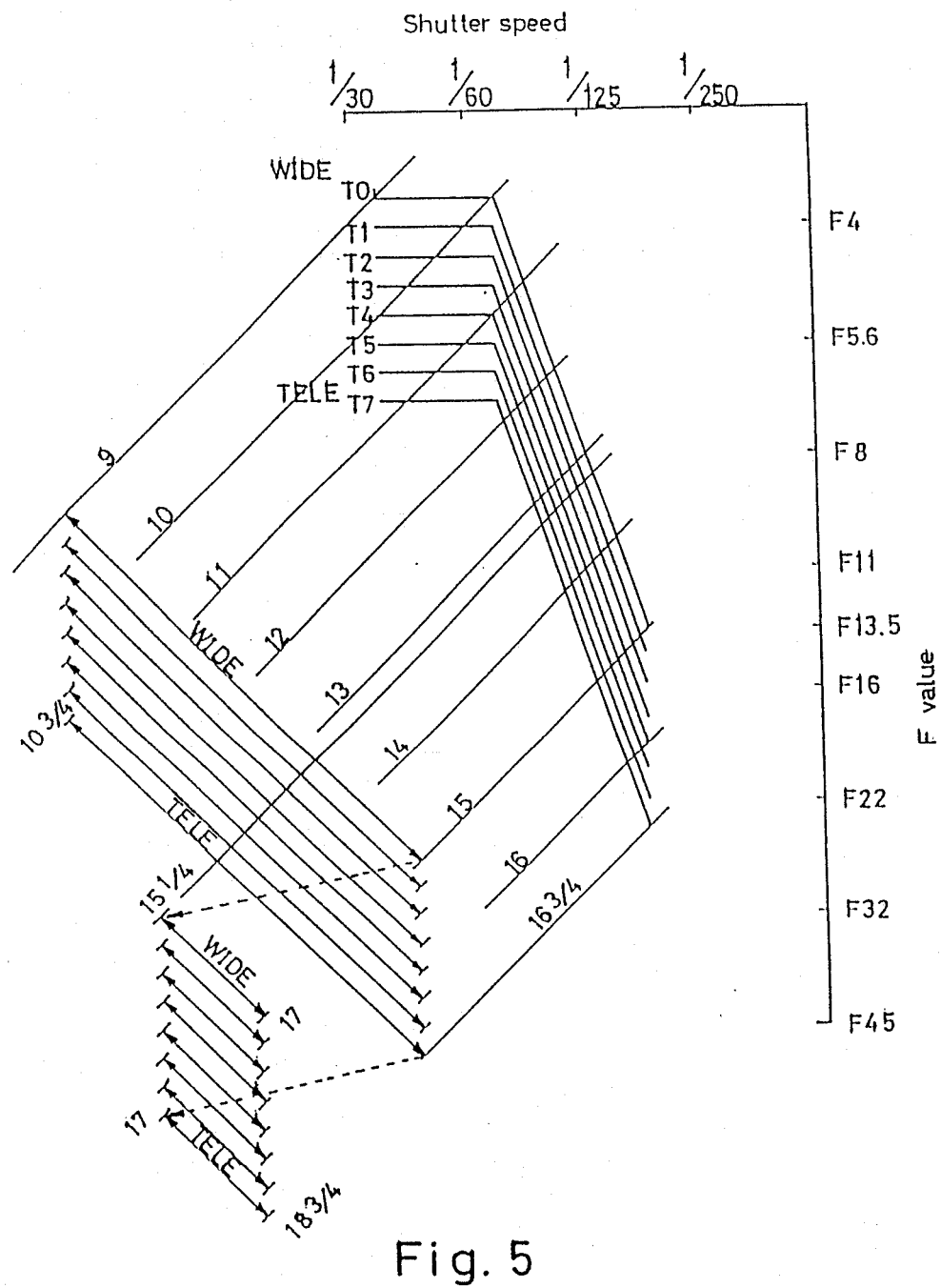
FIG. 5 is an example of a program diagram of the programmed shutter used in FIG. 4.
Figure 6:
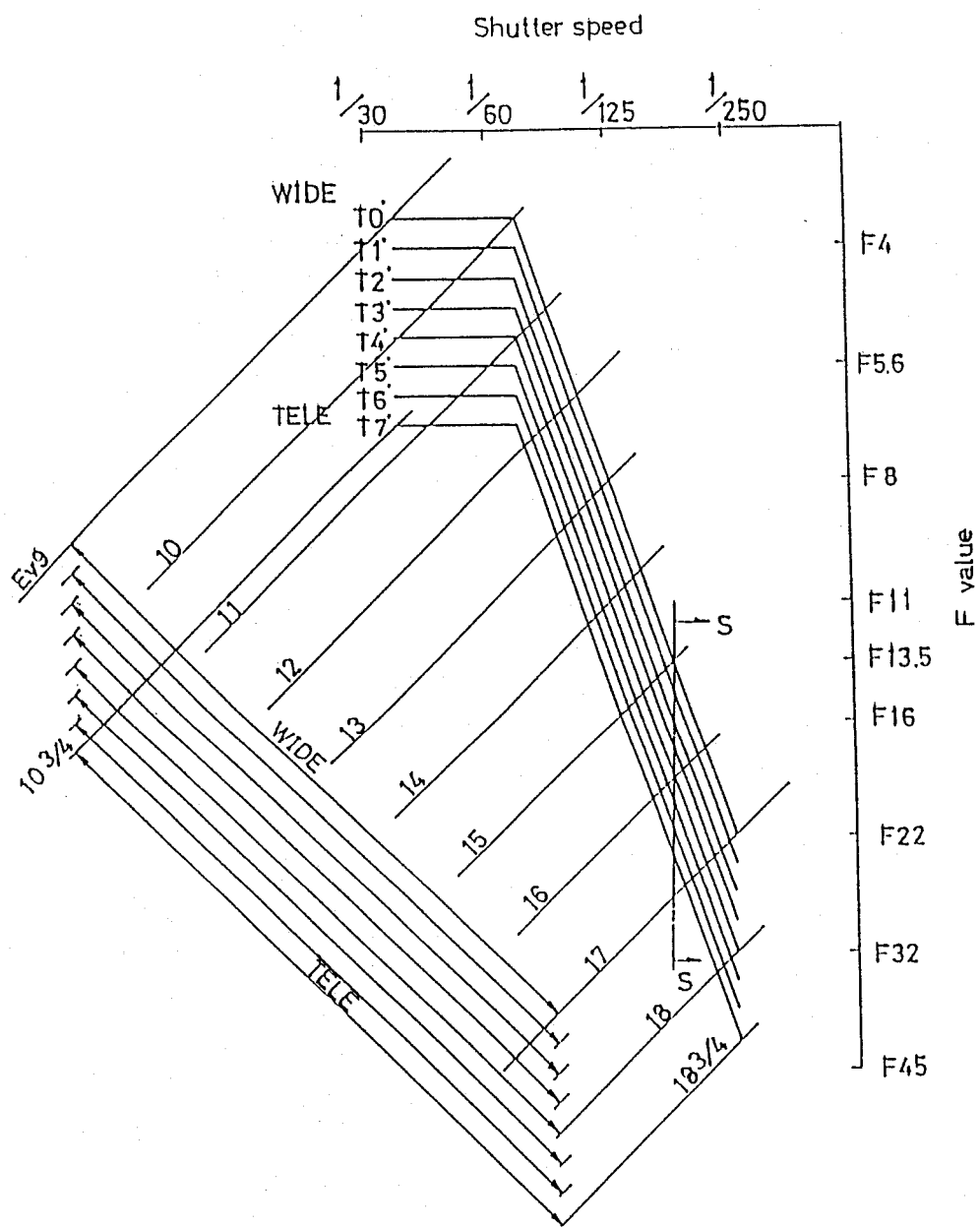
FIG. 6 is a program diagram of the shutter of FIG. 4 in which, e.g., no foreign matter photographing problem occurs.
Figure 7A:
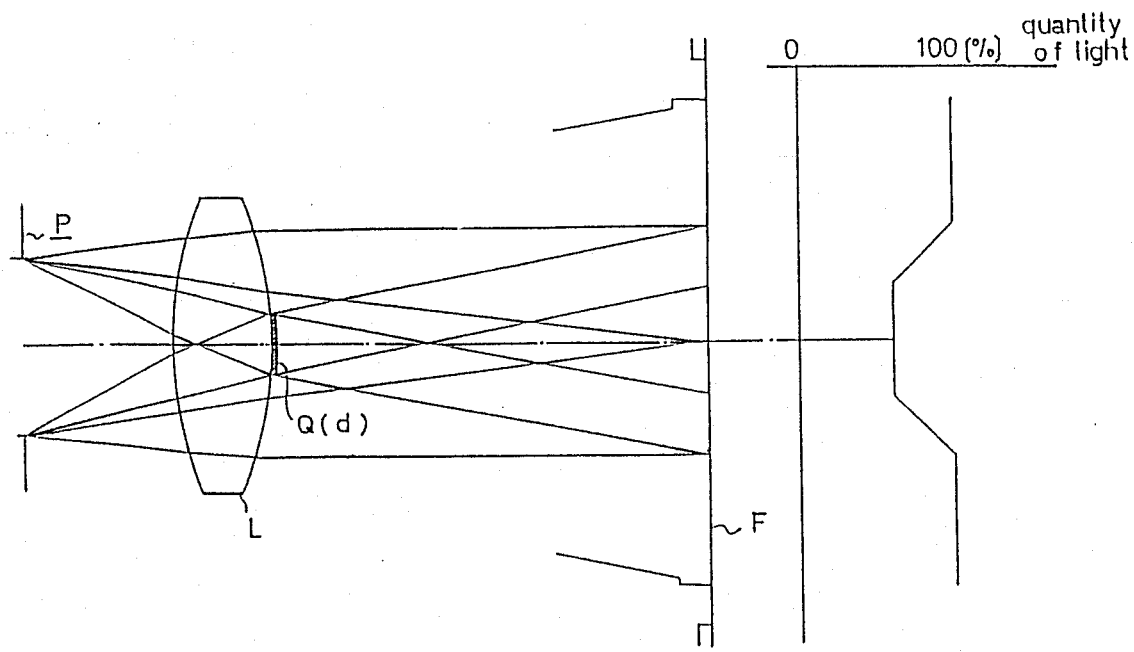
FIGS. 7A, 7B and 7C, respectively, are schematic views illustrating the optical paths and distribution of light in combination with specific diaphragm values and different positions of the lens system.
Figure 7B:
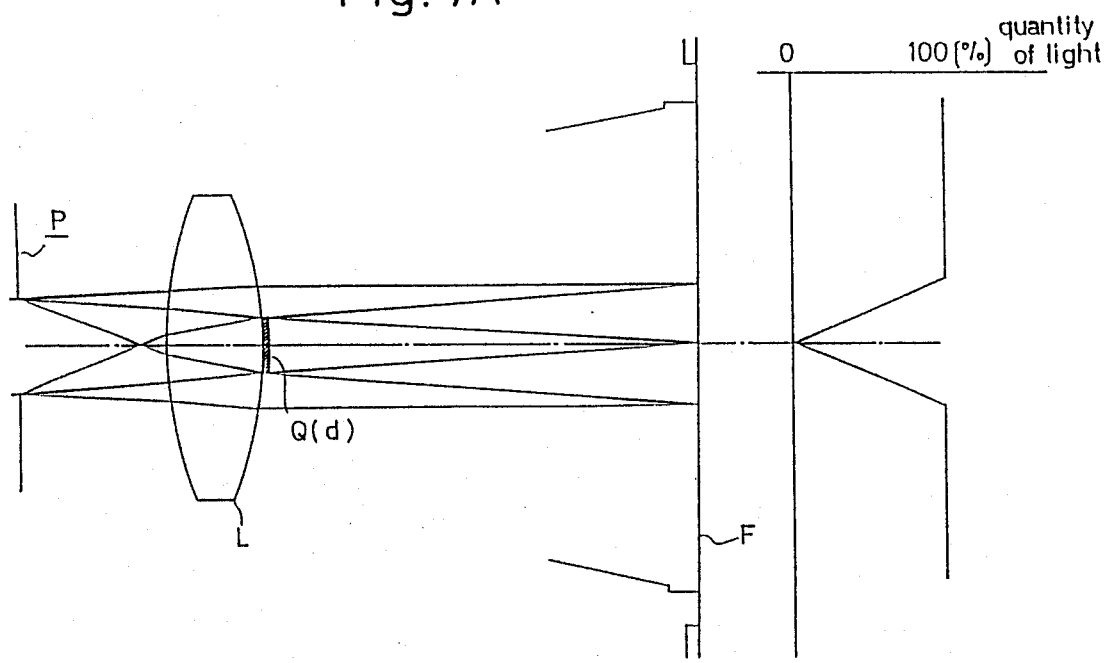
Figure 7C:
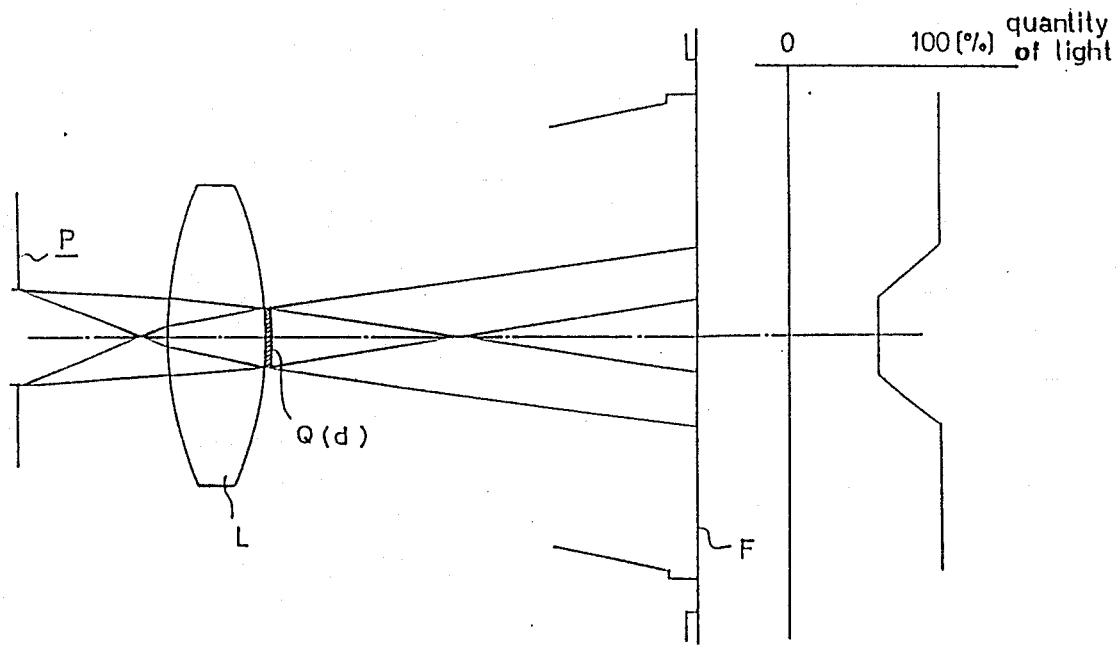

The following discussion will be directed to a second embodiment of the invention, which is illustrated in FIGS. 4-6.

A lens system L is provided with a swing arm 12 which has, at its front end, a neutral density (i.e., ND) filter 11 which is located in the area of a portion of the lens system in which the optical path is mainly diaphragmed, as illustrated in FIG. 4. The outer end of swing or pivoting arm 12 is connected to a swing shaft 14 of swing actuator 13, such that when the swing actuator 13 is operated, swing arm 12, and, accordingly, ND filter 11, will swing through an angle theta, between an operational position E in which ND filter 11 is located at the center of lens system L, and a retracted position R, in which ND filter 11 is retracted from the optical path of lens system L. Swing actuator 13 can be, e.g., magnetically driven.

Diameter D of ND filter 11 is at least larger than the specific diameter of the exit pupil P at which the problem of foreign matter being photographed begins to occur.

The swing arm is either formed from a transparent material, or is positioned such that it cannot be photographed in the picture, or has a diameter or width which is sufficiently small as to prevent it from being photographed when a picture is taken. Swing actuator 13 is also positioned so as not to be photographed in the picture. Preferably, to this end, swing shaft 14 of swing actuator 13 is connected to an outer end of swing arm 12 by a connecting rod (not shown) which extends parallel to the optical axis of lens system L.

ND filter 11, swing arm 12, and swing actuator 13 are all supported in the lens barrel which supports lens system L, such that they move along the optical axis together with lens system L during a zooming operation of the lens system.

FIG. 5 illustrates a program diagram of the programmed shutter of the present invention, and FIG. 6 illustrates a program diagram in which no problem will arise with respect to foreign matter being photographed in the picture.

In the diagram which is illustrated in FIG. 6, exposure value EV varies in 8 steps, i.e., T0'~T7', in accordance with the F number which, in turn, varies in accordance with the change of focal length from the wide angle extremity (WIDE) to the telephoto extremity (TELE). When no problem relating to foreign matter being photographed in the picture exists, as shown in FIG. 6, exposure can be controlled between EV9 (WIDE extremity: T0') and EV18.75 (TELE extremity: T7').

However, the problem of foreign matter being photographed in a picture occurs when the diaphragm value is below F13.5 at WIDE extremity T0' in this embodiment of this invention. Therefore, in accordance with the present invention, the area defined by S, in which the diaphragm aperture is below F13.5, is assumed to be an area in which foreign matter can be photographed, and exposure is controlled in such a way that when the diaphragm value is within area S, the program diagram of the programmed shutter will be shifted to a program diagram having a combination of large diaphragm values and corresponding shutter speeds, in accordance with the amount of light transmitted through ND filter 11, as shown in FIG. 5.

Area S is determined by the maximum EV which provides a shutter speed which is identical to a reference shutter speed of about 1/190 seconds, as obtained by the diagram representing T0=F13.5 in FIG. 5.

Since the diaphragm value increases as the focal length increases when the mechanical diaphragm aperture is not changed, in a zoom lens system as noted above, the minimum diaphragm value in area S becomes large, i.e., T1, T2 . . . T7 (i.e., the diaphragm aperture decreases).

The rearmost lens system is generally moved forward to set the TELE mode, and, accordingly, there is virtually no possibility that foreign matter will be photographed even at a diaphragm value of about F45. Nonetheless, a shutter speed of about 1/190 seconds is selected as a reference at the TELE mode to facilitate operation of the camera.

Control device or circuit 15, as shown in FIG. 4, sends operational signals to swing actuator 13 and program circuit 19, in response to output signals of focal length detecting device 16, subject distance detecting device 17, and diaphragm value detecting device 18, e.g. Specifically, when the diaphragm value or the focal length range are out of the ranges in which foreign matter can be photographed, no operational signal will be applied to swing actuator 13, such that the ND filter 11 will be maintained in its retracted position R in which the filter is retracted away from the optical path of the lens system. In this condition, program circuit 19 will control exposure in accordance with the normal program diagram.

To the contrary, when there is a possibility that foreign matter will be photographed in a given picture, control circuit 15 will provide operational signals to swing actuator 13 so as to pivot ND filter 11 into an operational position in which the ND filter is located in the optical path of the lens system, as shown in solid lines in FIG. 4. Simultaneously, control circuit 15 will command program circuit 19 to control exposure in accordance with a program diagram which is shifted, in order to decrease exposure value EV, as noted above. Specifically, exposure when using the ND filter will be controlled in accordance with diaphragm apertures which are larger than the diaphragm apertures used before the ND filter is inserted, and with corresponding shutter speeds.

In the example illustrated in FIG. 5, the quantity of transmission light transmitted through ND filter 11 is 25%. As one example, looking at T0 at the WIDE extremity, ND filter 11 will move into its operational position, in which it is located in the optical path, when the diaphragm value exceeds F13.5 (EV15). When the ND filter 11 moves into the operational position, exposure will be controlled in accordance with the program diagram which is shifted by 1.75 of EV in order to decrease the diaphragm value. Namely, when EV is 15.25, the diaphragm value is about F8.5 and the aperture becomes larger, such that the problem of foreign matter being photographed in the picture can be eliminated. The shutter speed at such time, i.e., about 1/135 second is relatively low, and does not cause any problem when the system is used. At T0, the exposure which can be controlled is EV17. If the diaphragm value becomes F13.5 again, it is also possible to further shift the program diagram in order to further decrease EV, providing an additional ND filter or filters in the optical path, or by replacing a first ND filter with another ND filter which has a lower efficiency of light transmission. This can be repeated in order to take a picture of a subject of very high EV.

The above discussion has been directed to T0 at the WIDE extremity, but the same is also applicable to T1~T7. The maximum EV is 18.75 when T7 is at the TELE extremity, in the example given.

Although the illustrated embodiments are intended for use in a zoom lens system, the ND filter can be brought into its operational position, in which it is located in the optical path of the lens system, and the program diagram which is shifted towards the small EV can be used, when a switching lens or lenses is inserted into the lens system, thereby creating a problem of foreign matter being photographed, in a two focal length type of camera.

As seen from the above, apparatus is provided in accordance with the present invention, such that even if a specific combination of lens system position and diaphragm value exist, the possibility that foreign matter applied to the rearmost lens of the lens system will be photographed in a picture can be decreased. Particularly, it is possible to maintain the diaphragm aperture above a predetermined value by inserting a ND filter in the optical path of the lens system in order to prevent foreign matter from being photographed in a picture without decreasing the controllable EV.

Figures 8, 9:
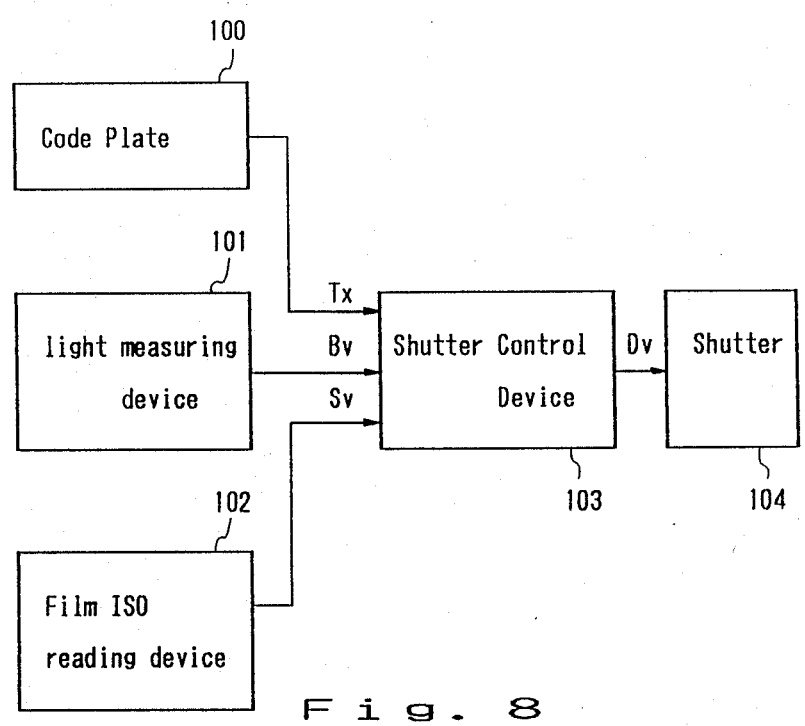
FIG. 8 is a schematic view illustrating how focal length data taken from a code plate provided on the cam ring of a zoom lens is used to control the shutter, along with film sensitivity data and brightness data.
FIG. 9 is a table illustrating modified EV values and restricted shutter driving signals Dv.

As illustrated in FIG. 8, focal length data Tx is taken from a code plate 100 provided on a cam ring of the zoom lens (having eight focal length steps T0~T7), brightness data Bv representing the brightness of the subject is taken from light measuring device 101, and film sensitivity data Sv is input into the shutter control device 103. It is noted that $Bv + Sv = EV$ (exposure value). Shutter control device 103 then outputs a driving signal Dv for driving shutter 104 in accordance with the data referred to above. The shutter driving signal Dv is restricted to 9~16 (with a plurality of changes of a magnitude of 0.25) in the illustrated embodiment. As the driving signal decreases, the shutter speed decreases, and the diaphragm value increases (i.e., the diaphragm aperture increases), and vice versa.

It must be kept in mind that when the focal length of the zoom lens increase, the relative diaphragm value will vary, even at the same shutter driving signal Dv. The vertical lines in FIG. 12 indicate that this occurs. Specifically, for example, when Dv is 10, the shutter speed is constant and has a value of about 1/70. However, the F number varies, so that it will be about F3.7 at T0, F4 at T1, ... and F5.6 at T5, e.g. This occurs because when the focal length varies, the F number varies even under the same mechanical diaphragm aperture conditions. The same is true for other Dv values.

FIG. 10 is a table illustrating actual EV values and the shutter driving signals Dv which can be obtained from focal lengths T0~T7 of the zoom lens corresponding to the EV's. The actual shutter is controlled in accordance with a sequence determined by the table, except in the area which is restricted in accordance with the present invention. In the table, it can be seen that when the exposure values EV of the subject are identical to each other, e.g., equal to 11, shutter driving signals Dv are, e.g., 11 at the focal length T0 and 10 at the focal length T4, respectively. The table illustrates the actual EV values of the subject, and, accordingly, includes EV values up to a maximum EV of 18.75. Assuming that the values did not belong to the area to be restricted by the present invention, the Dv at maximum EV is 17. It should also be appreciated that although EV and Dv at T0 are identical to each other, it may also be possible to set these values different from each other.

It can also be understood from the table of FIG. 10 that it is necessary to adjust the EV value such that the Dv value will decrease as the focal length of the zoom lens increases, even if the light of the subject does not vary. The modified Ev values are represented by delta EV in FIG. 9; the EV values are modified by 0.25 EV for each step from T0-T7.

Figure 11:
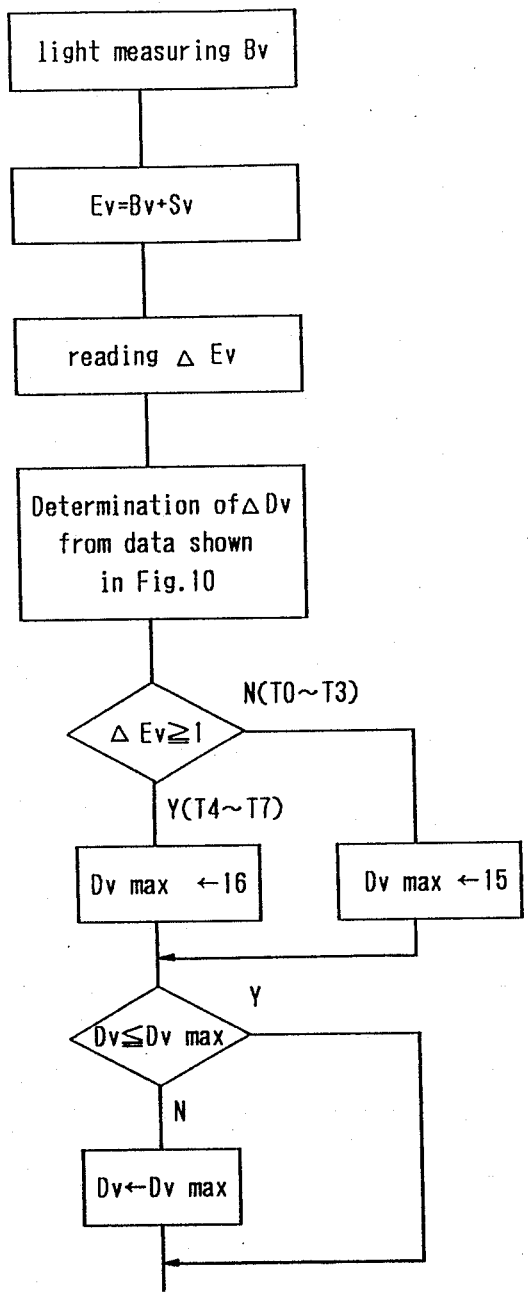
FIG. 11 is a flow chart for a shutter control device.

Control in the cross-hatched area of FIGS. 1, 2, or 2' are explained with specific reference to FIGS. 10 and 11; FIG. 11 illustrates a control flow chart as detailed hereinafter.

Initially, the Bv value can be detected by the measuring light device, and thereafter the EV value can be calculated by the detected Bv and the film sensitivity value which is read in advance. Thereafter, based upon the calculated EV and the modified EV value delta EV, which can be determined in accordance with the focal lengths of T0~T7, the shutter driving signal Dv can be determined in the manner illustrated in FIG. 10, as noted above.

According to the present invention, shutter driving signals Dv are restricted, particularly on the high EV side, as noted above. In the illustrated embodiment, for T0~T3, the maximum Dv is Dv=15; and for T4~T7, the maximum Dv is Dv=16. Therefore, dependent upon the value of delta EV, i.e., whether the modified EV (i.e., delta EV) is above 1 (namely, whether the focal length is within T0~T3 or T4~T7) the restricted Dv will be modified, such that when Dv is above 15 (or 16), the Dv is restricted to be 15 (or 16) and when Dv is below 15 (or 16), the Dv will be directly output without modification.

Figure 12:
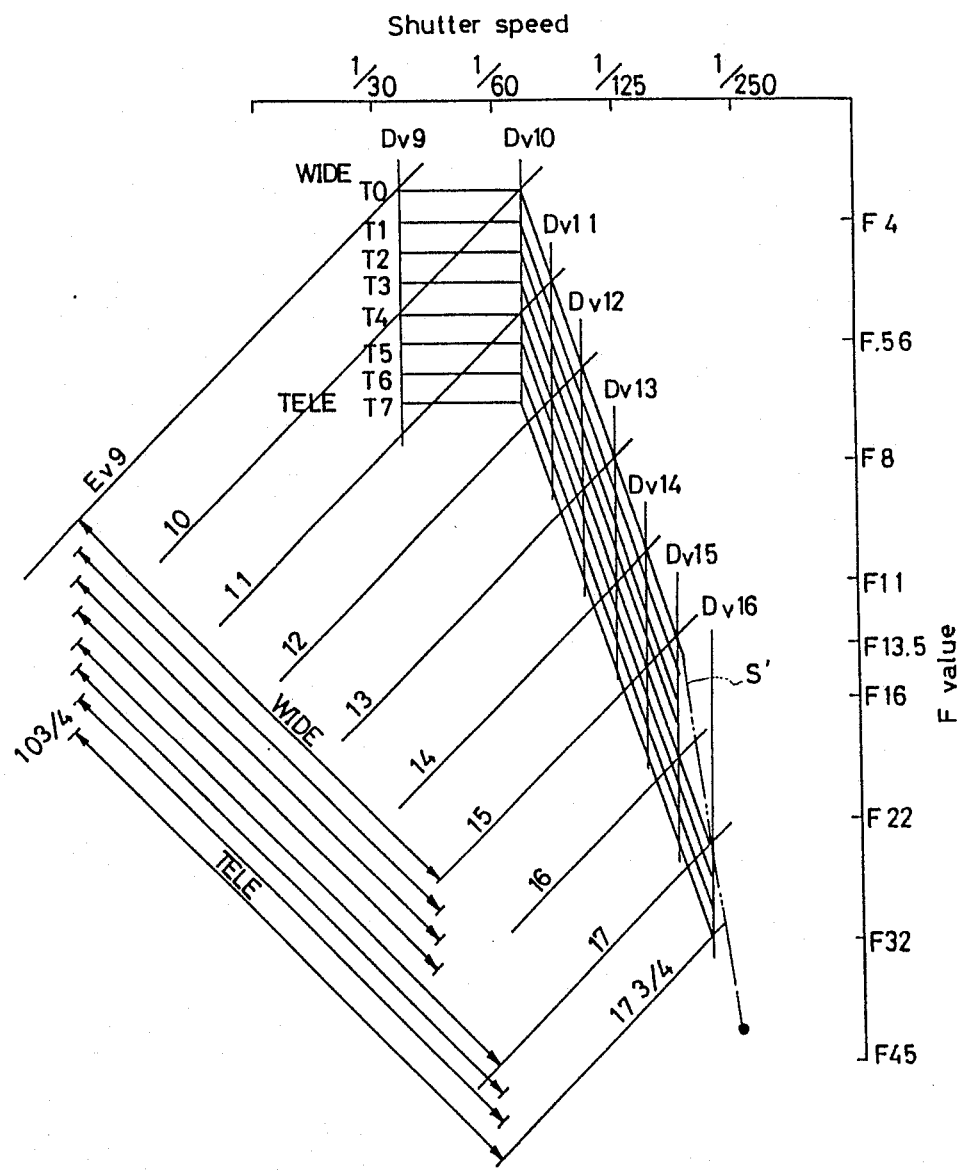
FIG. 12 is a view of a program diagram similar to that of FIG. 2, illustrating, via vertical lines, how the diaphragm value changes with changes in focal length of a zoom lens, even at a constant shutter driving signal Dv.

The control referred to above corresponds precisely to the control in either FIG. 2 or FIG. 12. However, it is possible to modify the maximum Dv and still be within the scope of the present invention.

Essentially, the present invention is directed to the avoidance of photographing dirt and other fine particles which are on the lens in a zoom lens ( or dual focal length) camera. When the camera is in its wide angle, short focal length position, there is a problem with such particles. This problem can be avoided by opening the diaphragm aperture; in such a situation, it is necessary to increase the speed of the shutter opening in order to compensate for the increased amount of light which is being permitted into the picture. If, however, the maximum speed of the shutter is reached and adequate compensation is not achieved, a neutral density filter must be positioned forwardly of the lens in order to avoid overexposure.

In accordance with the basic process of the present invention, the aperture is automatically opened wider at the wide angle setting, and there is a need to operate the shutter automatically at higher speeds in order to compensate for overexposure resulting from such a wider aperture. As a result, the neutral density filter is positioned in front of the lens system so as to compensate for such overexposure.

For a given light measurement and focal length setting, the programmed shutter automatically sets the aperture opening and the shutter speed.

It should be clear from the above that other features and advantages of the present invention can be altered and still be within the scope and contemplation of the present invention as defined by the claims.

We claim:

1. A programmed shutter used in a lens shutter type of camera having a lens system with at least two different focal lengths, said camera having a variable mechanical diaphragm aperture having F numbers, respectively, corresponding to a small diaphragm aperture on the long focal length side of said lens system and to a large diaphragm aperture on the short focal length side of said lens system, in accordance with changing focal lengths of said lens system, said shutter constructed such that said diaphragm has an F number Fa on the short focal length side of said lens system, Fa being greater than an F number Fb, said F number Fb being obtained when the focal length of said lens system is changed while maintaining the minimum diaphragm aperture on the long focal length side of said lens system, said diaphragm minimum value Fa on the short focal length side of said lens system representing a greater diaphragm aperture than Fb, wherein said shutter comprises means for controlling exposure in said camera by controlling a combination of said F numbers and shutter speeds corresponding to said F numbers.

2. A programmed shutter in accordance with claim 1, wherein said lens system is a variable power lens system comprising a zoom lens system, wherein variations in the focal length and F numbers of said zoom lens system are represented by a focal length-F-number program diagram.

3. A programmed shutter in accordance with claim 2, wherein said diaphragm aperture includes a first area which is smaller than an area, on the focal length-F-number diagram, defined by a line which connects the minimum diaphragm value at the longest focal length of the zoom lens system and the minimum diaphragm value at a shorter focal length of said zoom lens system, said programmed shutter including means for ignoring said first area.

4. A programmed shutter in accordance with claim 3, wherein said minimum diaphragm value at said shorter focal length side of said lens system is identical to the minimum diaphragm value at the shortest focal length side of the zoom lens system.

5. A programmed shutter in accordance with claim 3, said minimum diaphragm value at the shorter focal length side of said zoom lens system being identical to the minimum diaphragm value at an intermediate focal length of said zoom lens system.

6. A shutter in accordance with claim 1, in combination with a camera having a zoom lens ssystem.

7. A shutter in accordance with claim 1, in combination with a camera having a variable power lens system having at least two focal lengths.

8. In a lens shutter type of camera having a lens system with at least two different focal lengths, a device for preventing foreign matter on at least one lens in said lens system from being photographed, said device comprising a neutral density filter which can be selectively inserted along the optical path of said lens system and an actuator for moving the neutral density filter into an operational position in which said filter is inserted along said lens system optical path, said device further comprising means for controlling exposure, said exposure controlling means comprising means for setting a diaphragm aperture which is larger than the diaphragm aperture prior to insertion of said neutral density filter along said optical path and a shutter speed which corresponds to said diaphragm aperture, wherein said diaphragm aperture and said shutter speed are both selected in accordance with the quantity of light which is transmitted through said neutral density filter.

9. A device in accordance with claim 8, wherein said neutral density filter has a diameter which is larger than a diameter of an exit pupil of said camera, said neutral density filter being located at the center of said lens system when it is inserted along the optical path of said lens system.

10. A device in accordance with claim 9, wherein said neutral density filter is attached to a front end of a swingable arm which pivots about an axis located away from the optical path of said lens system, said arm being actuated by an actuator.

11. A device in accordance with claim 10, wherein said swing arm comprises a non-photographible material.

12. A device in accordance with claim 10, wherein said swing arm is positioned away from the image plane of said camera.

13. A device in accordance with either of claims 11 or 12, further comprising a control circuit which is adapted to receive input signals from a focal length detecting device, a subject distance detecting device, and a diaphragm value detecting device in order to actuate the swing arm when said control circuit determines that there is a possibility that foreign matter will be photographed in a picture, wherein said swing arm, when actuated, pivots in order to move said neutral density filter into the optical path of said lens system, said control circuit comprising means for determining the exposure in accordance with a program diagram which is shifted towards an EV (exposure value) value having a larger diaphragm aperture than does a program diagram before insertion of said filter along said optical path.

14. A device in accordance with claim 13, further comprising a plurality of pivotable neutral density filters which are superimposed upon each other in order to vary their light transmission efficiency, said device further comprising means for shifting said program diagram towards a small EV value in accordance with a decrease in the light transmission efficiency of said neutral density filter.

15. A device in accordance with claim 13, comprising a plurality of neutral density filters which are adapted to be selectively and individually positioned along the optical axis of said lens system in order to vary the light transmission efficiency of said filter, said device further comprising means for shifting said program diagram towards a small EV value in accordance with a decrease in the light transmission efficiency of the neutral density filter which is positioned along said optical axis.

16. A device in accordance with claim 8, wherein said lens system comprises a zoom lens system or a variable power lens system having at least two focal lengths.

17. A device adapted for use in a lens shutter type of camera having either a zoom lens system or a variable power lens system having at least two focal lengths, said camera further including a mechanical diaphragm aperture with F numbers on long and short focal length sides of said lens system, which F numbers change in accordance with change in the focal length of said lens system, said device including means for preventing said camera from photographing undesirable material which is present on said lens system.

18. A device in accordance with claim 17, wherein said preventing means comprises means for controlling exposure in accordance with said F numbers and associated shutter speeds, said device having a minimum F number Fa, on the short focal length side of said lens system, Fa being larger than the minimum F number Fb of the diaphgram aperture when the lens system closely approaches a camera film plane.

19. A device in accordance with claim 18, wherein said lens system is a zoom lens, said device further comprising a programmed shutter and a program diagram for controlling said shutter, said program diagram comprising an F number Fd at an intermediate focal length area.

20. A device in accordance with claim 18, wherein said program diagram includes eight focal length steps, said shutter comprising means for determining shutter speeds and diaphragm F numbers in accordance with the exposure value of a subject to be photographed.

21. A device in accordance with claim 18, wherein the minimum diaphragm value F wherein the minimum diaphgram value is F 13.5 at a WIDE position of said lens system and F 42 at a TELE position of said lens system.

22. A device in accordance with claim 18, said diagram comprising means for excluding said shutter from operation in all areas in which foreign matter on said lens can be photographed.

23. A device in accordance with claim 17, said preventing means further comprising a pivotable arm having a neutral density filter attached to one end of said arm, said filter being selectively pivotable into the optical axis of said lens system.

24. A device in accordance with claim 18, said preventing means further comprising a pivotable arm having a neutral density filter attached to one end of said arm, said filter being selectively pivotable into the optical axis of said lens system.

25. A device in accordance with claim 24, wherein said filter has a diameter D larger than a diameter of the camera exit pupil.

26. A device in accordance with claim 24, said arm being attached to a shaft of a pivotable actuator at a second end of said arm.

27. A device in accordance with claim 26, wherein said filter is pivotable between a first, operative position along the optical axis of said lens system and a second, retracted position away from said optical axis.

28. A device in accordance with claim 24, wherein said arm is transparent.

29. A device in accordance with claim 24, wherein said arm has a width which is too small to be viewed in a photograph.

30. A device in accordance with claim 24, wherein said filter, said arm, and said actuator are supported in a lens barrel which also supports said lens system, wherein said filter, arm and actuator are all moveable together with said lens system.

31. A device in accordance with claim 24, said device further comprising a program circuit, a pivot arm actuator, and a control circuit.

32. A device in accordance with claim 31, wherein said control circuit comprises means for receiving focal length data, subject distance data, and diaphragm F value data.

33. A device in accordance with claim 31, wherein said control circuit comprises means for giving operational signals to said pivot arm actuator in order to selectively pivot said neutral density filter.

34. A device in accordance with claim 33, said control circuit further comprising means for directing said program circuit to control exposure in accordance with a shifted program diagram which has been shifted to decrease exposure values from those exposure values on a first program diagram.

35. A device in accordance with claim 18, said device further comprising a shutter control device, a code plate with lens system focal length data, a light measuring device, and a film sensitivity measuring device, said shutter control device comprising means for outputting a driving signal for driving a shutter in accordance with receipt of film sensitivity data, brightness data, and focal length data.

* * * * *

UNITED STATES PATENT AND TRADEMARK OFFICE
CERTIFICATE OF CORRECTION

PATENT NO. : 4,794,418
DATED : December 27, 1988
INVENTOR(S) : Takeo KABAYASHI et al.

It is certified that error appears in the above-identified patent and that said Letters Patent is hereby corrected as shown below:

At column 1, line 16, change "tyoe" to --type--.
At column 1, line 32, change "disphragm" to --diaphragm--.
At column 7, line 23, change "FS" to --F3--.
At column 14, line 27, change "ssystem" to --system--.

Signed and Sealed this

Eighteenth Day of June, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,794,418
DATED : December 27, 1988
INVENTOR(S) : T. Kobayashi et al It is certified that error appears in the above-indentified patent and that said Letters Patent is hereby corrected as shown below:

On the title page: Item [75], on the printed patent, change "KABAYASHI" to --Kobayashi --.

Item [19], "Kabayashi" should read --Kobayashi: --.

Signed and Sealed this

Thirteenth Day of July, 1993

Attest:

MICHAEL K. KIRK

Attesting Officer

Acting Commissioner of Patents and Trademarks